(12) United States Patent
Krachtus

(10) Patent No.: US 8,670,065 B2
(45) Date of Patent: Mar. 11, 2014

(54) METHODS AND SYSTEMS FOR CAMERAS WITH A DISPOSABLE HOUSING

(75) Inventor: Werner Krachtus, Bechtsrieth (DE)

(73) Assignee: DigiDays, AG, Neustadt a.d. Waldnaab (DE)

( * ) Notice: Subject to any disclaimer, the term of this patent is extended or adjusted under 35 U.S.C. 154(b) by 298 days.

(21) Appl. No.: 12/859,219

(22) Filed: Aug. 18, 2010

(65) Prior Publication Data

US 2012/0044367 A1    Feb. 23, 2012

(51) Int. Cl.
*H04N 5/222*    (2006.01)
*H04N 7/18*    (2006.01)
*G03B 15/00*    (2006.01)

(52) U.S. Cl.
USPC ............................. 348/370; 348/151; 396/6

(58) Field of Classification Search
USPC ............. 348/231.7, 207.1, 207.11, 231.6, 81, 348/143, 151, 373; 396/6
See application file for complete search history.

(56) References Cited

U.S. PATENT DOCUMENTS

| | | | |
|---|---|---|---|
| 5,348,239 A | 9/1994 | Enomoto | |
| 6,151,449 A | 11/2000 | Horning et al. | |
| 6,628,895 B2 | 9/2003 | Fredlund et al. | |
| 6,950,129 B1* | 9/2005 | Minne et al. | 348/231.7 |
| 6,970,186 B1 | 11/2005 | Silverbrook | |
| 7,126,629 B1* | 10/2006 | Braunstein et al. | 348/207.1 |
| 2001/0022617 A1 | 9/2001 | Takaba et al. | |
| 2001/0040625 A1* | 11/2001 | Okada et al. | 348/207 |
| 2002/0047904 A1 | 4/2002 | Okada | |
| 2002/0095477 A1 | 7/2002 | Hirata et al. | |
| 2004/0223049 A1 | 11/2004 | Taniguchi et al. | |
| 2004/0252992 A1 | 12/2004 | Hunter | |
| 2005/0041144 A1* | 2/2005 | Mitchell et al. | 348/376 |
| 2005/0099499 A1 | 5/2005 | Braunstein et al. | |
| 2006/0227197 A1 | 10/2006 | Silverbrook et al. | |
| 2007/0035629 A1 | 2/2007 | Braunstein et al. | |
| 2007/0046773 A1 | 3/2007 | Fredlund | |
| 2008/0240694 A1 | 10/2008 | Okazaki | |

FOREIGN PATENT DOCUMENTS

| | | |
|---|---|---|
| DE | 10022498 A1 | 11/2001 |
| JP | 2005252797 | 9/2005 |
| WO | 03047245 A1 | 6/2003 |
| WO | 2012022696 A1 | 2/2012 |
| WO | 2012022700 A1 | 2/2012 |
| WO | 2012022701 A1 | 2/2012 |
| WO | 2012022702 A1 | 2/2012 |

OTHER PUBLICATIONS

Feb. 11, 2011, International Search Report and Written Opinion of the International Searching Authority from European Patent Office, in PCT/EP2011/063992, which claims priority to this U.S. application.

Feb. 11, 2011, International Search Report and Written Opinion of the International Searching Authority from European Patent Office, in PCT/EP2011/063996, which claims priority to this U.S. application.

(Continued)

*Primary Examiner* — Mekonnen Dagnew
(74) *Attorney, Agent, or Firm* — Kolisch Hartwell, PC

(57) ABSTRACT

The present disclosure comprises a camera that includes a plurality of technical components including an optical system, an actuator device, and an energy source. The camera also includes a disposable housing for receiving said technical components.

21 Claims, 6 Drawing Sheets

(56) References Cited

OTHER PUBLICATIONS

Feb. 11, 2011, International Search Report and Written Opinion of the International Searching Authority from European Patent Office, in PCT/EP2011/063998, which claims priority to this U.S. application.
Mar. 11, 2011, International Search Report and Written Opinion of the International Searching Authority from European Patent Office, in PCT/EP2011/063997, which claims priority to this U.S. application.
Mar. 30, 2012, Office Action from US Patent and Trademark Office, in U.S. Appl. No. 12/859,212, which is another application of applicant Werner Krachtus.
Apr. 3, 2012, Office Action from US Patent and Trademark Office, in U.S. Appl. No. 12/859,226, which is another application of applicant Werner Krachtus.
Jun. 20, 2012, Office Action from US Patent and Trademark Office, in U.S. Appl. No. 12/859,231, which is another application of applicant Werner Krachtus.
Oct. 26, 2012, Office Action from US Patent and Trademark Office, in U.S. Appl. No. 12/859,212, which is another application of applicant Werner Krachtus.
Dec. 24, 2012, Office Action from US Patent and Trademark Office, in U.S. Appl. No. 12/859,226, which is another application of applicant Werner Krachtus.
European Patent Office; Office Action for EP 11 757 195.0; Dated Nov. 27, 2013; 6 pages.
European Patent Office (Nicolas Roche, Substantive Examiner); Office Action for EP 11 755 029.3 Dated Dec. 6, 2013; 6 pages.

\* cited by examiner

METHODS AND SYSTEMS FOR CAMERAS WITH A DISPOSABLE HOUSING

BACKGROUND

The present disclosure relates to cameras that may comprise a plurality of technical components and a housing for receiving the technical components.

Conventional single-use or disposable cameras have been available in the market for quite a long time. The cameras may be sold in any kind of shop or outlet location.

They are simply constructed, comprise simple components and are relatively cheap. Usually, single-use or disposable cameras are box cameras with a roll of film installed. Most of them use focus free lenses. Usually they have an inbuilt flash light.

Often they are distributed and used at particular occasions such as celebrations or weddings. There are also cameras available having a watertight housing. They may be used under water for underwater photography while snorkeling or diving. The cameras are particularly popular in situations where a reusable camera would be easily stolen or damaged.

After taking a predetermined number of photographs the whole camera is sent to a laboratory for processing, i.e., for developing the film and producing photographs. Because the film cannot be changed, the housing is opened in the laboratory. After developing the film the photographs are sent back to the user. The opened cameras are usually disposed, only some of them are recycled, i.e., refilled with film and resold.

However, although the cameras are cheap and handling is easy, there are some serious drawbacks. Due to the use of cheap components, the quality of the photographs is not satisfactory. Furthermore, environmental aspects are not considered in this system as the camera may be made from different materials which may not be separated easily. Moreover, users may want to have more flexibility with respect to the products they obtain and more influence on the design of the product.

Therefore, it is an object of the present disclosure to solve these problems, namely, to increase the quality of single-use cameras, to consider environmental aspects, to prevent hacking of the camera and to provide customized products.

SUMMARY

A camera according to the present disclosure may comprise a plurality of technical components including an optical system, an actuator device, and an energy source; and a housing for receiving the technical components. The housing may be a disposable housing.

The camera may be designed for use in a single-use system, as described herein. The camera may include a single-use housing whereas the other components received in the housing may be multi-use components. Thus, the quality of the technical components may be improved as their lifetime is longer than with conventional disposable cameras.

Furthermore, the design of the housing, e.g., customized design, for weddings, etc., and the functionality of the housing, e.g., watertight edition for diving, may be varied. The housing may be exchanged according to demand, whereas the technical components may be re-used. The housing may be detachable from the other technical components by the provider of the camera and it is thus exchangeable.

The camera may be a digital camera (or any camera or camcorder or recording device). Digital cameras may give more options to process pictures in a closed circuit system as will be described later.

When using a digital camera, the technical components may include at least an image sensor and a memory for storing image data. The technical components may additionally include at least one of a viewfinder and a monitor for displaying images. In simple, single-use cameras, the viewfinder may comprise one or two plastic lenses (one of them may be at each side of the housing). The exposure image may be seen in the viewfinder lens. In some embodiments, the camera may include a monitor which may fulfill the functionality of a viewfinder and also display images already taken.

The technical components of the digital camera may be configured and arranged like in a conventional digital camera. The main components may include an optical system (i.e., a camera lens or objective for focusing the picture in an image plane), an actuator device (i.e., a shutter actuator having a shutter button that may be accessible and may protrude from the housing), and an energy source (e.g., a battery or rechargeable battery or accumulator); an image sensor (e.g., a light sensitive chip); a memory for storing image data; and a monitor for displaying images. Furthermore, there may be a logical unit, e.g., a controller; an RGB filter; high- and low-pass filters; and A/D converters.

The digital camera may be a compact camera or an SLR camera. However, for single-use applications, cameras having simple components, cost-effective cameras, and/or cameras providing easy handling may be preferred.

The sensor unit may comprise a CCD sensor on a circuit board or a CMOS sensor.

The camera may have an integrated monitor used as viewfinder and that allows displaying pictures that have already been taken.

The capacity of the energy source/power source may determine the maximum operating time of the camera. If the single-use camera is configured not to allow exchanging or recharging the power source, the energy source may be used to delimit a single-use phase of the single use camera, i.e., as soon as the power source is empty, the camera may not allow further operation and may be sent back to the provider who opens the housing, transfers data from the internal memory to an external device and processes them. For example, the provider may create a product, e.g., a photobook, any other printed matter, an item having a photo printed thereon, and send it back to the user.

The memory may be a memory card, e.g., a compact flash memory card or a removable card (which may only be removable when the housing has been removed from the technical components).

A digital camera may be a camera for taking photographs, but it may also have a functionality of taking film sequences. Also, the camera may be a camcorder. It is noted that in this application the term "camera" may be used for all these possibilities.

The technical components may include a flashlight. Depending on the application, the housing may be designed to either allow flashlight functionality or not. By changing the design of the housing, various functionalities may be blocked or released according to the provider's decision, e.g., by blocking particular actuation devices.

The technical components may be multi-use components. Whereas the housing may be for single-use or even disposable, the technical components may be used for several cycles of single use. It is not believed that a single-use housing in combination with multi-use technical components has not been offered in this field of business so far.

In some embodiments of the present disclosure, the housing may be removable from the technical components upon opening the housing. Thus, the housing may be exchanged easily. For example, the housing may encapsulate most of the technical components. It may be difficult to open the housing. The housing may be a molded resin element which is glued around the technical components, and/or fixed with bolts or screws that may not be conventional screws (i.e., the screws may only be opened by using special tools). Inside, the connection between the housing and the technical components may, on the other hand, be easily detachable. The technical components may only be positioned in the housing by form closure or positive fit, or by a small number of screws which may easily be removed. Thus, the housing may be easily exchanged and removed from the technical components.

The technical components may be fixed to a carrier construction. Thus, the technical components may not fall apart after removing the housing, but may keep in a defined relative position to each other. So the components may be positioned in any other housing and enclosed therein. The camera may be considered to comprise the technical components as a first module, and the housing as a second module. The provider is free to combine a first module with various designs of the second module.

The housing may be configured for blocking access to any interface for transferring data from the camera to an external device, e.g., external memory. Only after opening or breaking the housing may data be extracted from the memory of the camera.

In another embodiment of the present disclosure, the housing may be configured for blocking access to at least one of the memory and the energy source of the camera. The user may be prevented from transferring data unless he/she breaks the housing open or manages to open it with special tools.

The camera may include an interface for transferring data from the camera to an external device only after removing the housing from the technical components.

The housing may encapsulate the technical components. Of course, actuators, like the shutter button, may be exposed to be actuated by the user.

In another embodiment of the present disclosure, the housing may be watertight. This application may be useful, for example, in diving or swimming spots, for taking underwater photographs.

The housing may have a customized design. This means that the shape and the imprint of the housing may be adapted to particular occasions. For example, for weddings, the colors of the housing may be adapted to fit the colors of the wedding location. The design may also be adapted to comply with the theme of a celebration. At least the design is variable and many different designs may be offered. Because the housing may be single-use, the design of the cameras may be amended and varied according to market demand very easily in a closed circle system according to the present disclosure.

The housing may be transparent as well. For example, the housing may be made of acrylic glass. The housing may also be made of any other resin material that complies with technical requirements like stability, protection against impact, dust and water, etc.

The camera may be configured for taking a limited number of exposures and for recording a limited time of film sequences, respectively.

Due to the possible multi-use functionality of the technical components, the camera may be configured for being reset after the housing has been removed from the technical components for allowing taking another sequence of a limited number of exposures and/or for allowing recording another limited time of film sequences, respectively. The technical components of the camera, except for the housing, may be applied in many single-use cycles.

A digital camera according to the present disclosure may comprise a plurality of technical components that may include an optical system, an actuator device, an image sensor, a memory for storing image data, and a monitor for displaying images, and an energy source; and a housing for receiving the technical components; wherein the camera may not include a user accessible interface for transferring data from the camera to an external device. Access to the interface may be blocked by the housing or a cover which may not be removed easily by a user. For example, the cover may be glued or welded to the housing and only be opened with special tools by the provider. The cover may be fixed to the housing by bolts or screws that are not accessible or do not comply with standard tools.

Another digital camera according to the present disclosure may comprise a plurality of technical components that may include an optical system, an actuator device, an image sensor, a memory for storing image data, and a monitor for displaying images, and an energy source; and a housing for receiving the technical components; wherein the camera may include a lock for preventing access to any interface in order to prevent data transfer from the camera to an external device unless an access key is applied for unlocking the lock. The lock may be any device preventing transfer of useable data from the memory of the camera. The lock may include mechanical locks as well as software solutions preventing data transfer, or storing encoded image data on the memory of the camera (only the provider may have the code for decoding). The data transfer may be enabled by unlocking an interface or a link. Unlocking may be provided by changing settings in the software of the camera, by unlocking a mechanical lock, e.g., by opening a cover portion of the housing or by destroying the housing of the camera, etc. Encoded data stored in the camera may be decoded by the provider. The data transfer may be accomplished by a cable connection or wireless, e.g., by wireless LAN. Any encoding/decoding method may be considered to provide a lock for disabling unauthorized users to transfer data.

A system for processing digital camera exposures according to the present disclosure may comprises a network that may include a provider station for providing digital processing services, and at least one user station connected to the provider station; and at least one camera as described above. The provider may provide both a single-use camera and digital processing services in a closed circuit system. The provider may provide the cameras to the users, collect them to process the photographs after a single-use cycle, and determine the housing for a new cycle of the camera.

The provider station may store camera exposure data taken with the digital camera and allow access to the digital camera exposures upon input of an individual user identifier.

The camera and the user identifier may be provided as a set before using the camera during a single use stage.

The digital camera may provide a limited number of exposures to be taken during a single use stage/cycle.

Another method of providing digital photography services to a user according to the present disclosure may comprise a provider offering in combination a. a digital camera or digital camcorder for taking photographs or film sequences during a single-use phase; and b. at least one of digital photography processing services and a product based on the photographs taken by the user and returned to the provider.

The price for an offer (package) may substantially correspond to the price of the services/products included in the offer. However, the services/products included in the offer may only be claimed after returning the camera or camcorder to the provider. Thus the price paid for the package before claiming the services/products may include in the offer a deposit for the camera. Therefore, there may be a high incentive to return the camera to the provider after a single-use phase. The camera may be left to the user free of charge (or for a certain amount for renting the camera) for a single-use range. The provider may "lend" the camera to the user when selling the package upon a deposit which is the price for the services. It may be a feature of the present disclosure that the provider does not make a loss even when the user keeps the camera, hacks the camera, etc. The value of the camera/camcorder and the value of the services/products may substantially correspond. Small variations of the price, e.g., for compensating for administrational cost, additional charge for risk of having to repair or replace cameras, etc., may be within the scope of the present disclosure. However, the user may have the feeling or belief that he/she does not pay at all for the camera, but only for the services which he converts in exchange for the camera after his/her particular single-use phase.

Another aspect of the present disclosure may be that the provider of the camera/camcorder is also the provider of the services/products acquired together with the camera/camcorder. In conventional systems, a disposable camera could be sent to any laboratory for developing the film. The laboratory charged extra for their services. In the present disclosure, selling the package may include providing a camera on a loan basis and selling digital photography services like printing books. All the steps are carried out and administered by the same provider (i.e., the system and method may be a closed circuit.). A single-use cycle system and method may be provided, wherein the cameras may be circulated to be used during single-use cycles. The plurality of cameras may be circulated in the closed circuit. For example, a first part of the plurality of cameras may be distributed among another plurality of users taking photos in their particular single-use phase. Another part of the plurality of cameras may have been returned from users to the provider for producing selected items or for carrying out selected services. Another part of the plurality of cameras may have been reset for another single-use phase and offered in a shop or in any other sales location to customers who are interested in acquiring the package of camera and other products/services. In the closed circuit, there may be just a single payment transaction, for example when the user buys the package.

Furthermore, the method may combine services and advantages of single-use cameras and digital photography services, e.g., ordering a photobook, in a very simple manner. A user may make a decision about the product when buying the package, e.g., when there is a choice of different packages for different services), he/she may make a decision when returning the camera to the provider by filling in a order card, and/or after retrieving (and selecting/processing) the data in the provider's access area in a global network.

The single-use phase may be defined by a restriction of the number of photographs to be taken with the camera or the exposure time for film sequences to be taken with the camcorder. The digital camera or the digital camcorder may have a limited capacity of exposures and recording time, respectively, during a single-use phase. The camera may be a single-use camera or a reusable camera having a limited number of exposures to be taken during a single-use stage or a limited recording time for film sequences to be taken during a single-use stage. In some embodiments of the present disclosure, the capacity of the camera/camcorder may be limited by the charge state of the power source, e.g., the accumulator, battery, rechargeable battery, etc. As long as the power source is charged, exposures and films may be taken. If the charge state is "empty", the camera may need to be returned because the camera may be configured that the user is not enabled to re-charge the power source or change the battery. For example, the battery may be integrated within the housing of the camera without access for the user. The power source and the other technical components may be encapsulated in the housing. In some embodiments of the present disclosure, a set of power sources that are particularly suitable and fitting in the camera may be provided at the time of acquiring the camera.

Furthermore, the cameras circulating in the closed circuit of the system/method according to the present disclosure may include an ID chip, e.g., RFID chip, or any other identification device such that the pictures taken and returned to the provider by a particular user can be unambiguously attributed to the user. As pictures may be considered very private and personal it is important to avoid any confusion of users and picture sets. An ID chip which may be connected with the camera may allow identifying a set of image data when the camera is returned to the provider until the product is sent to the user. The system may be configured such that an order form filled in by a user (or any personal data, e.g., name, address, etc., provided by the user) comprises a first code and the ID chip comprises the same or another code which is attributed to the first code. Thus, customer/user data and a camera returned by this particular customer/user may always be attributed to the personal data of the user even though during the technical process the camera may be separated from the order form or from the data provided by the user.

In some embodiments of the present disclosure, the digital camera or the digital camcorder may be a multi-use camera and a multi-use camcorder, respectively, which may be used in several subsequent single-use stages/phases, i.e., in several subsequent cycles of single-use applications. Thus the quality of the components may be improved compared with disposable cameras. Furthermore, an improvement may be achieved by digital technology and processing. Furthermore, "recycling" may be very easy because it is accomplished by simply providing memory space for the next single-use stage. This can be done by deleting data from a memory or by resetting the camera.

A software solution may be implemented in the logical circuit of the camera. It may deny user access to the internal memory of the camera or it may encode exposure data stored in the internal memory of the camera. Only the provider may be able to deactivate the blocking or to decode the data.

A hardware solution may comprise a mechanical blocking of a link or an interface provided in the camera. Whereas the internal memory of the camera is blocked against access by the user, the provider may have a "key" to unlock the download functionality. For example, the "key" may be a tool for breaking or opening the housing of the camera in order to obtain access to the memory card, a link, an interface, etc. However, the housing may just be an encapsulation which may be opened by applying force, or by applying a special tool for opening, e.g., screws or bolts to open the housing. Another possibility is that the housing may be destroyed by the provider in order to be able to access the memory and the housing may be replaced for the next single-use stage (i.e., the housing may be a single-use housing, whereas the other components of the camera may be multi-use components).

In some embodiments of the present disclosure, the method may include providing in said combination a voucher for claiming said photography processing services and said product.

The product may include that a photograph taken is provided as data stored on a recording medium such as a DVD, a CD or online in a print format. Or the product may be printed matter, e.g., a photobook, an album, etc.

The digital camera and the digital camcorder, respectively, may be offered in a receptacle or together with a receptacle for receiving the digital camera and digital camcorder, respectively, after termination of the single-use phase, and returning it to the provider. After having taken pictures, the user may return the camera to the provider. The receptacle may comprise a field, e.g., including a stamp, indicating that the correct postage has been paid (which may be included in the purchase price for the offer).

Payment of the combination may be effected at the time or before the time of handing over the camera and camcorder, respectively, to the user so that the user may not pay for the camera directly, but for the services/products included in the offer. The purchase price may be used as (or include) a deposit for the camera until it is returned to the provider (i.e., the user may have to return the camera or camcorder before claiming digital photography processing services and a product included in the offer).

The camera may have a functionality of taking photographs and film sequences. The offer may be adapted to this functionality by providing a camera which is configured for recording a combination of pictures and film sequences until a predetermined capacity is used.

A system of providing digital photography services to a user may comprise a provider offering in combination a. a digital camera or digital camcorder for taking photographs or film sequences during a single-use phase; and b. at least one of digital photography processing services and a product based on the photographs taken by the user and returned to the provider; wherein the provider may have a camera distribution unit for distributing cameras in a distribution system, a receiving unit for receiving cameras returned by the users, a processing unit for processing exposure data provided by the users, and a memory for storing exposure data.

DETAILED DESCRIPTION

Figure 1:
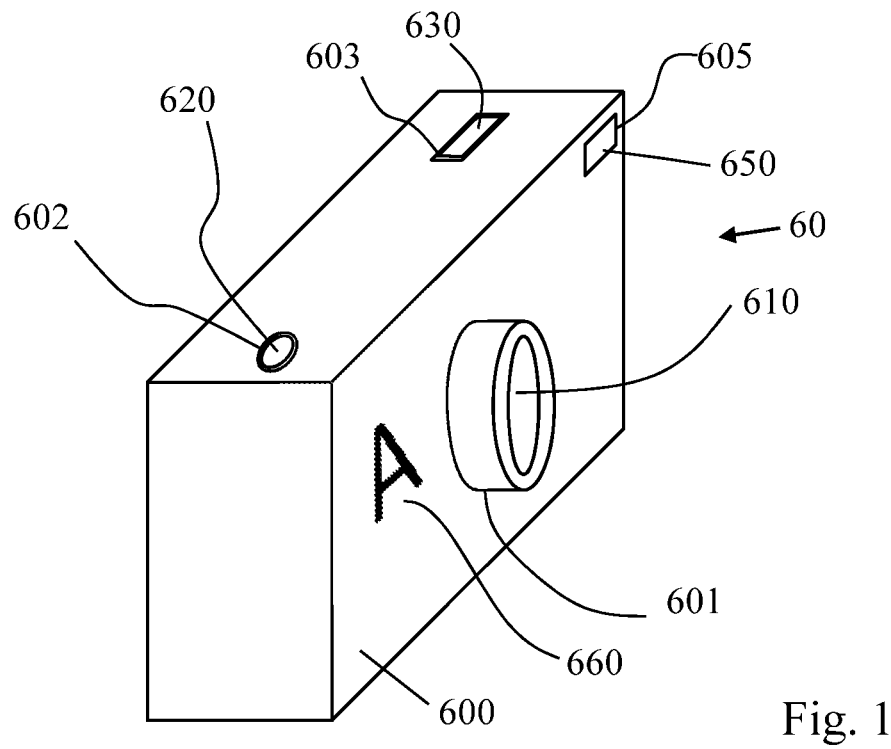
FIG. 1 illustrates an embodiment of a camera according to the present disclosure in a side perspective view.
Figure 2:
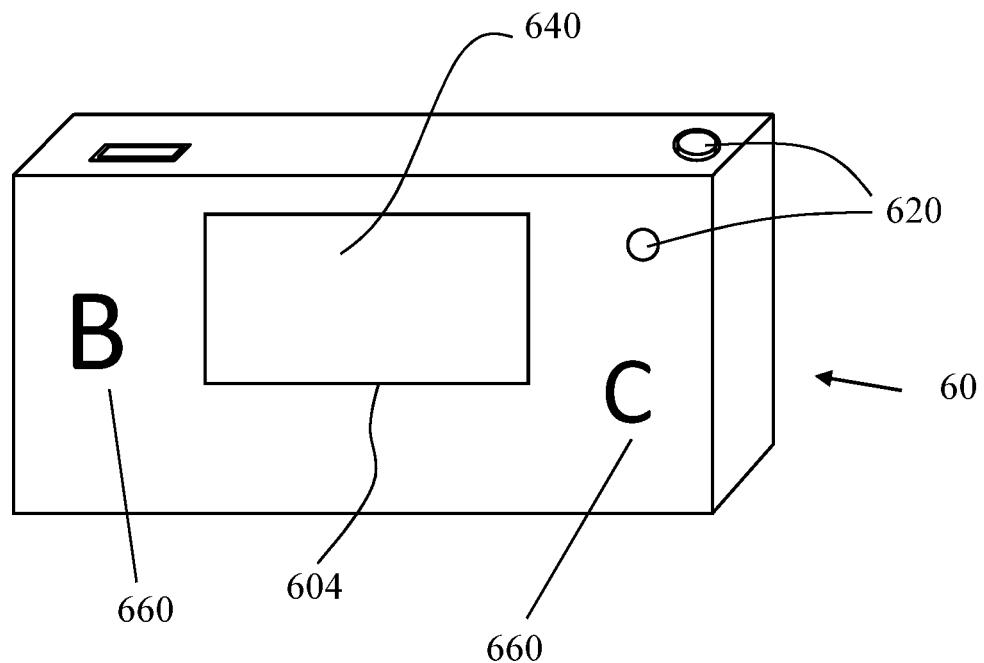
FIG. 2 illustrates the embodiment of the camera of FIG. 1 in a rear perspective view.

FIG. 1 and FIG. 2 illustrate an embodiment of a digital camera 60 according to the present disclosure from two different views.

The digital camera 60 may comprise a disposable housing 600 made of resin or any similar plastics materials. A first opening 601 may be provided in the housing 600 for the camera lens 610. A second opening 602 may be provided for allowing actuation of an actuator button 620. A third opening or a transparent window 603 may be provided in the housing 600 for a display 630 that may for example show the number of exposures that have already been taken. A third opening or transparent window 604 may be provided on the rear side of the camera for the monitor 640 of the digital camera 60. A fourth opening or transparent window 605 may be provided on the front side of the camera for the flashlight 650 of the digital camera 60. Reference numeral 660 indicates possible design options for the disposable housing 600.

In some embodiments, digital camera 60 may comprise a disposable housing 600 made of resin or any similar plastics materials and technical components. The technical components may include an optical system having a lens 610, an actuator button 620, and an energy source, an image sensor, a memory for storing image data, and a monitor for displaying images. The technical components may be multi-use components, whereas the housing 600 may be removable from the technical components and configured as a single-use element. Thus, the provider may be free to select and exchange the design of the housing.

In an embodiment shown in FIG. 2, the camera may have two actuator buttons 620 for actuating the shutter of the camera. A first button 620 may be arranged on the top surface of the camera housing 600, and a second button 620 may be arranged at the rear surface of the camera housing 600. The two buttons 620 may allow easy handling of the camera when taking horizontal pictures and when taking upright pictures. Whereas the first button is arranged for comfortable actuation when taking a horizontal picture, the second button may be used for taking upright pictures because it is in a better position for that purpose.

This feature may be useful in connection with camcorders (not shown, but the term "digital camera" is used synonymously with the term "digital camcorder" in the present application). But also when being provided in a camera, this feature may be useful in situations when the user holds the camera with one hand only, for example, during a roller coaster ride or at a party.

Figure 3:
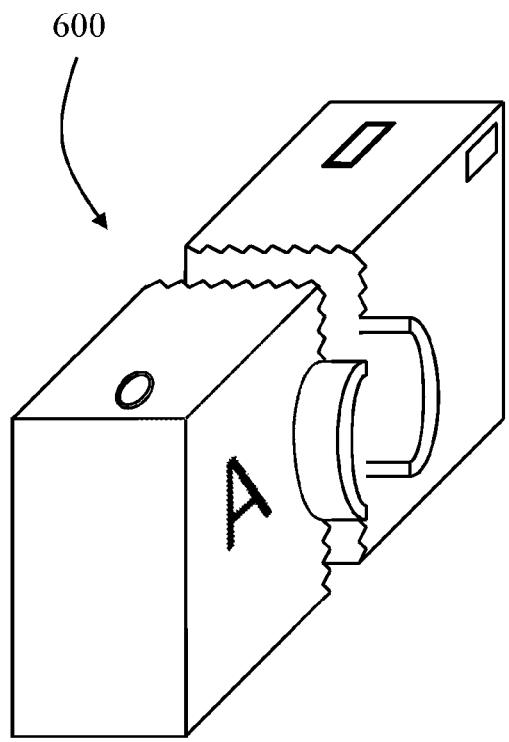
FIG. 3 illustrates a housing which had been destroyed and is ready for disposal.
Figure 4:
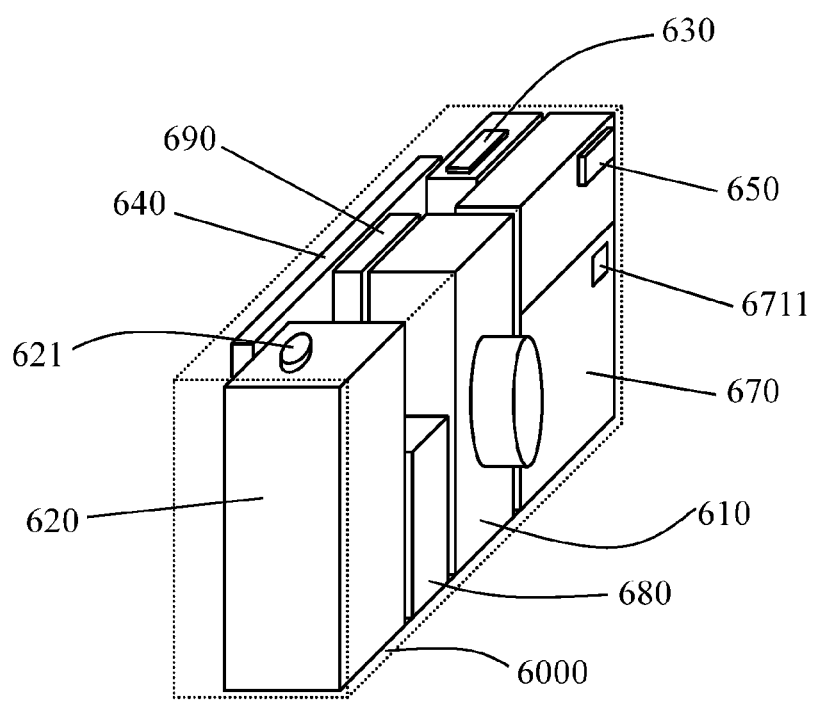
FIG. 4 illustrates the remaining technical components of the digital camera.

FIG. 3 shows a housing 600 which has been broken in two parts in order to remove the housing 600 from the other technical components illustrated in FIG. 4. The technical components of FIG. 4 may be housed within housing 600. The other technical components may include, as schematically shown in FIG. 4, an optical system 610 including the optical lens, an actuator unit 620 including an actuator button 621, a display unit 630 that may indicate information (e.g., number of pictures taken and/or remaining), an image sensor unit 690, a flashlight unit 650, a memory unit 670 for storing data, such as image data, an energy source unit 680, and a monitor unit 690 for displaying images. There may be further elements like cables for connecting components, a controller unit, an RGB filter, high- and low-pass filters, A/D converters, etc. These are known components of conventional digital cameras. The technical components as described may be fixed to a support 6000. In this embodiment, the support 6000 is a support plate, but it may have any other configuration for holding the technical components in a predetermined position after removal of the housing. The technical components may be re-usable, i.e., they may form a multi-use module, whereas the housing may be a single-use tool.

Another feature illustrated in FIG. 4 is that there may be at least one interface 6711 for transmitting data from the memory 670 to an external memory. The interface 6711 may be blocked by the housing 600. Furthermore, in another embodiment of the present disclosure, the interface 671 may be locked by a suitable software configuration. The image data could be stored as encoded data in the memory 670, thereby preventing a user from extracting usable data from the memory 670. In other embodiments, the housing may even be configured with an opening allowing access to the interface when the housing 600 is mounted to the technical components.

In the following description of further embodiments, elements corresponding to the same elements in earlier embodiments have the same reference numerals.

Figure 5:
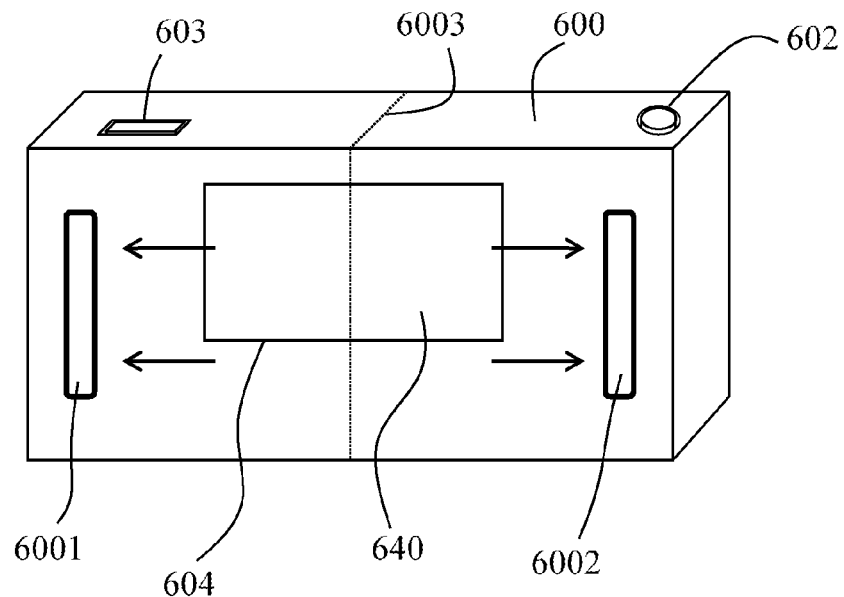
FIG. 5 illustrates another embodiment of a camera according to the present disclosure in a rear perspective view.

FIG. 5 shows another embodiment of the present disclosure. The rear cover of the housing 600 includes a first nose or protrusion 6001 and a second nose or protrusion 6002. As indicated by arrows, a special tool (not shown) may engage the first and second nose 6001, 6002 and force the two halves of the housing 600 apart. Furthermore, the housing 600 may have a predetermined breaking line 6003 where the housing is going to break in two halves as indicated in FIG. 3. Then the housing 600 can be removed from the remaining components.

Figure 6:
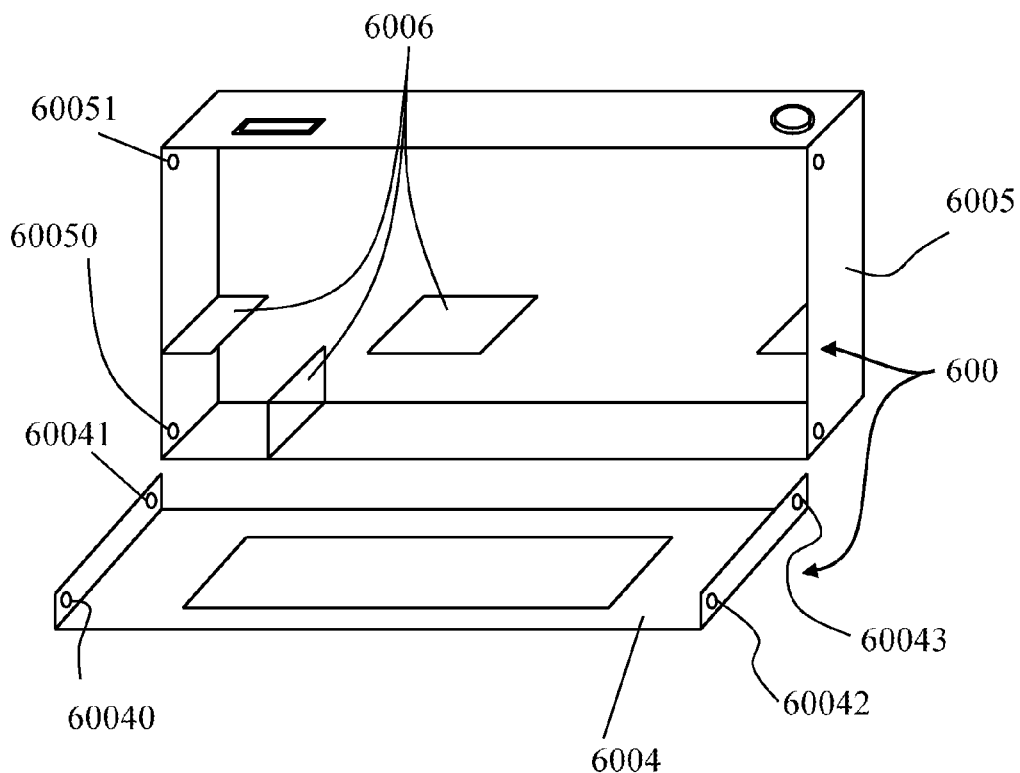
FIG. 6 illustrates another embodiment of a camera according to the present disclosure in a rear perspective view.

FIG. 6 shows another embodiment of the present disclosure, wherein the (empty) housing 600 has a cover 6004 which may be opened by means of a special tool. The cover 6004 and the main housing 6005 may be, when the camera is in use, connected by bolts as indicated by corresponding openings 60040, 60041, 60042, 60043 and 60050, 60051, respectively.

In this embodiment, another feature of the present disclosure can be seen. The empty main housing 6005 may comprise webs 6006 which allow inserting and fixing the technical components removeably within the housing 600 by means of positive locking or form closure. Also (not shown) some screws may be provided to fix the technical components in the housing. However, detaching the housing should be as easy as possible in order to facilitate easy detachment of the housing.

Figure 7:
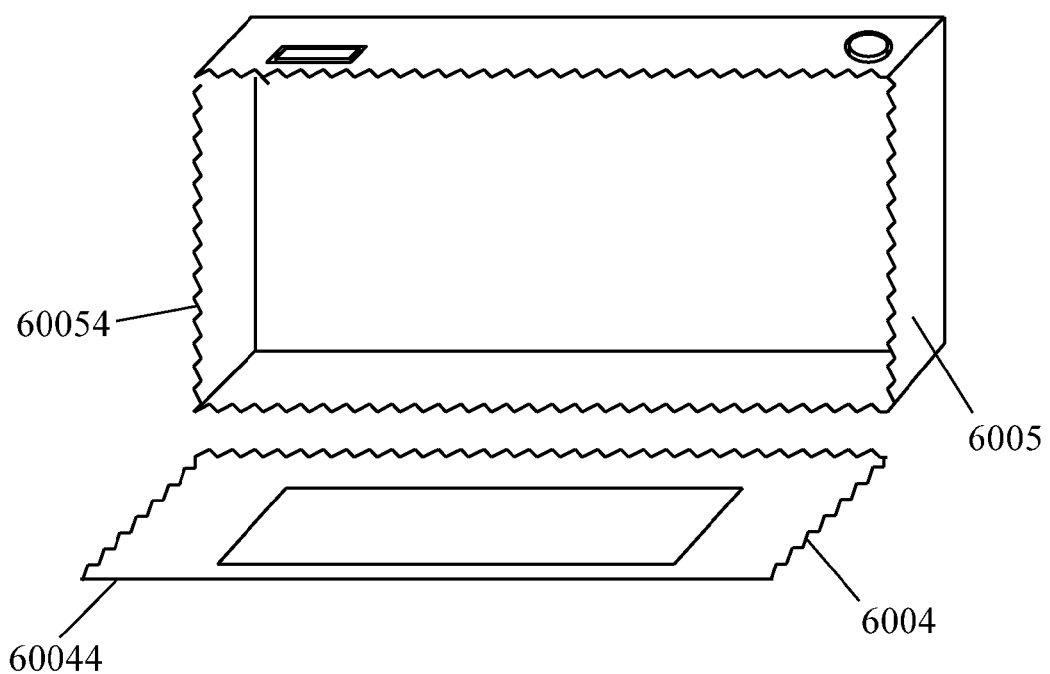
FIG. 7 illustrates another embodiment of a camera according to the present disclosure in a rear perspective view.

FIG. 7 shows another embodiment of the present disclosure, wherein a cover 6004 has been removed from the main housing 6005 by solving, e.g., breaking, a glued connection 60044, 60054 or a welded connection 60044, 60054.

Figure 8:
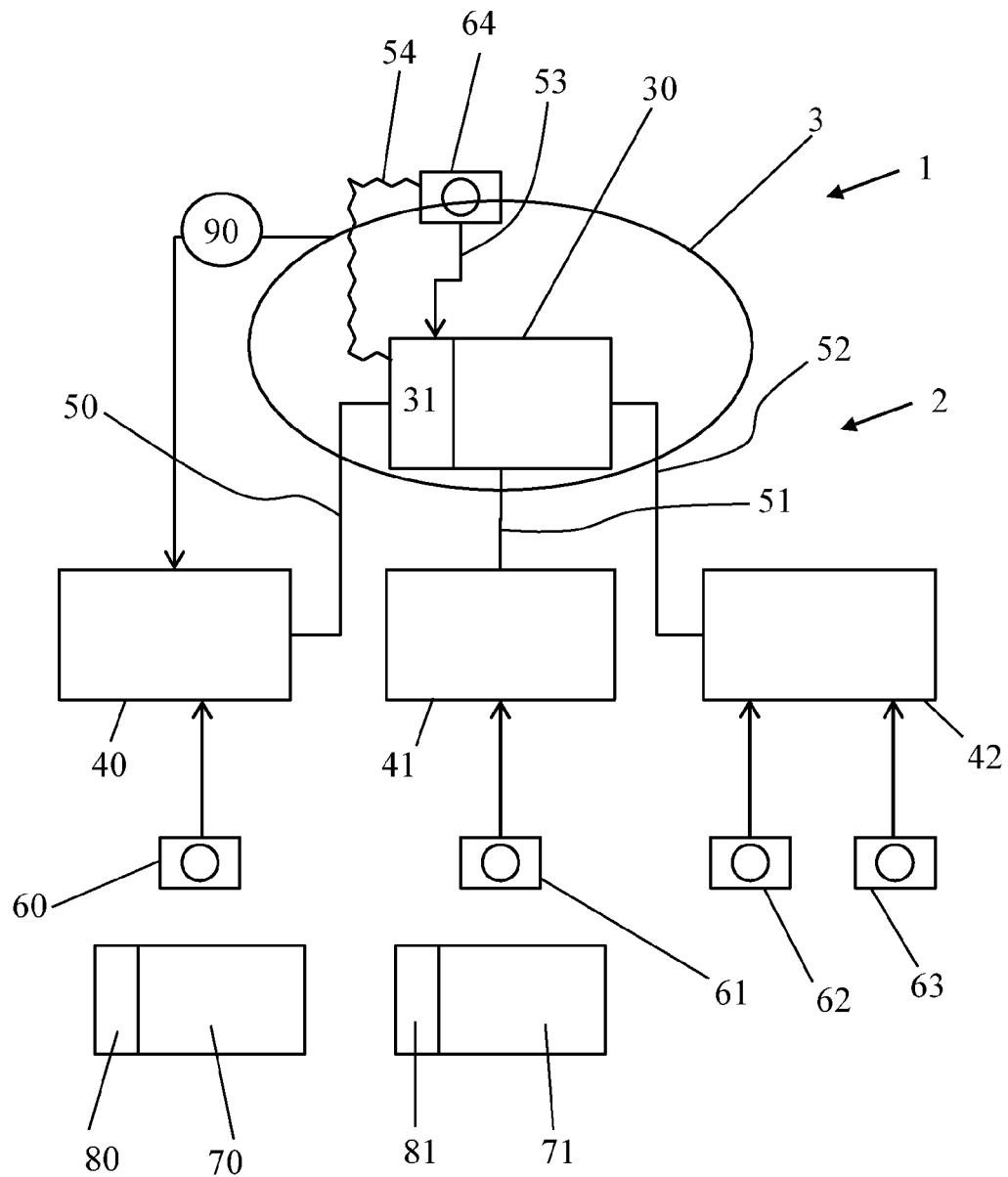
FIG. 8 illustrates a schematic view of a system according to the present disclosure.

Reference is made to FIG. 8 showing a schematic view of a system according to the present disclosure. A system 1 may comprise a network 2, e.g., a global network like the internet, and a provider 3.

The provider 3 may have a provider station 30 which is included in the network 2. Furthermore, the network 2 may comprise a plurality of user stations 40, 41, 42 which may be connected to the provider station 30 via cable connections 50, 51, and 52, respectively. However, in another embodiment of the present disclosure the connections may be wireless connections.

The user stations 40, 41, 42 may be computers, mobile phones, notebooks or any other electronic device being connected to the provider and having a user interface.

The system 1 may comprise a plurality of digital cameras 60, 61, 62, 63, and 64. Cameras 60, 61, 62 and 63 may be attributed to users 40, 41, and 42, respectively, as indicated by arrows. A further camera 64 may be just connected to the provider station 30.

The digital cameras 60, 61, 62, 63 and 64 may be designed to be used in a single-use stage (i.e., each of the cameras 60, 61, 62, 63 and 64 may have a limited number of exposures to be taken before the camera is sent to the provider 3). For example, the number of exposures may be limited to 24 or 36 exposures. After the maximum number of exposures has been taken, the camera may be disabled to take any further pictures. The number of exposures may be limited by software implementation or by a limitation of the capacity of the memory card of the camera.

The cameras may be disposable cameras. The cameras may also be re-usable after a single-use range for a next single-use range (i.e., the cameras may form a system of reusable cameras). After the data have been transferred from the memory of the camera to the memory 31 of the provider station 30, the memory of the camera may be deleted to provide memory for the next (and sometimes limited) number of exposures. It may also be possible to activate the memory for a new single-use range and thus enable the memory to overwrite data stored in the memory of the camera.

Furthermore, the cameras 60, 61, 62, 63 and 64 may be configured to prevent access to the memory of the camera. For example, the cameras 60, 61, 62, 63 and 64 may be configured to prevent transfer or downloading of the exposure data from the memory. This configuration may be implemented by providing no accessible interface or link for connecting the camera to an external memory. In another embodiment, the interface or link may be locked in order to prevent users from accessing data stored in the camera.

Only the provider 3 may be able to access and download the stored data to a memory 31 of the provider station 30 as shown in FIG. 1 with respect to camera 64. The data transfer may be enabled by unlocking an interface or a link. Unlocking may be provided by changing settings in the software of the camera, by unlocking a mechanical lock, e.g., by opening a cover portion of the housing or by destroying the housing of the camera, etc. Furthermore, the data stored in the camera may be encoded. Only the provider may be able to decode the data after a data transfer to memory 31. The data transfer may be accomplished by a cable connection 53 or wireless, e.g., by wireless LAN 54. Any encoding/decoding method may be considered to provide a lock for disabling unauthorized users to transfer data. If image data are stored as encoded data in the memory of the camera, a further advantage may be that in case of loss of the camera there is no risk that the images may be seen by uninvolved persons.

Furthermore, the system 1 may comprise receptacles 70, 71, e.g., a box, a bag or a pouch, provided with the cameras 60 and 61, respectively. The cameras 60, 61 may be received in one of the receptacle 70, 71 when being acquired by a user 40, 41. In the receptacle 70, 71, there may be a code 80, 81 or a voucher 80, 81. The code 80, 81 may allow accessing the provider station 30 to retrieve pictures taken with camera 60 and 61, respectively, from the memory 31 of the provider station 30. The provider station 30 may provide further functionalities enabling the user to process the pictures, to select pictures, to order selected pictures, to order a photobook or an album including selected pictures, etc. The code or voucher 80, 81 may be used to order printed photographs or a recording medium 90 such as CD or DVD with the photographs recorded thereon in a print format. The recording medium may also include software for further processing the photographs.

Figure 9:
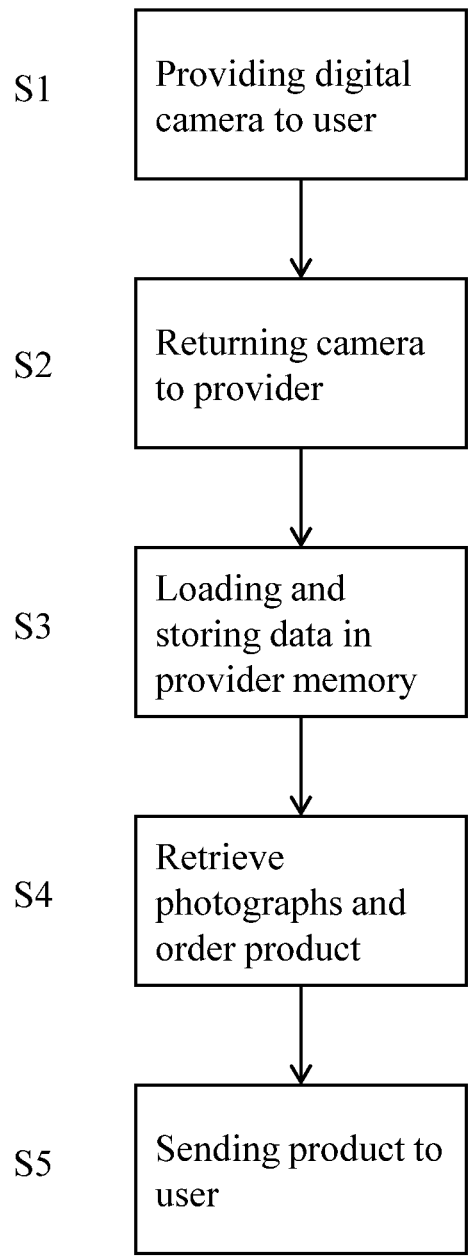
FIG. 9 illustrates a flow chart showing a method according to the present disclosure.

FIG. 9 illustrates a method according to the present disclosure.

In a step S1, a provider may provide, e.g., in a shop, digital cameras to be acquired by users. The camera may be received in a receptacle which also includes a code and/or a voucher. Instead of a single camera, a set of cameras may be offered to the user. When the user pays for the camera, he/she may acquire a package of goods/services including processing of the pictures by the provider as well as producing and sending products such as photobooks, printed matter, or other items (like cups, T-shirts, etc.), including selected photographs taken with the camera.

In a step S2, after the user may have taken a (perhaps limited) number of photographs, the camera may be returned to the provider. The provider may load and store, in a step S3, image data from the camera to a provider memory.

In a step S4, the user may, via a user station, retrieve the image data sent to the provider upon entering the code. He may select a number of photographs, create a photobook or an album, process the images, etc. Afterwards, he may order particular products (e.g., a photobook, printed hardware, a data storage medium such as a CD or a DVD) including the selected photographs. The order may be sent directly via the network after logging in the access area of provider station by entering the code. Alternatively, the voucher may be cashed for ordering the product.

In a step S5 the ordered product may be produced and sent to the user. Alternatively, the product may be provided online to be downloaded by the user and printed out or stored at the user station.

Although the present disclosure has been provided with reference to the foregoing operational principles and embodiments, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, but neither require nor exclude two or more such elements. Further, ordinal indicators, such as first, second, or third for identified elements are used to distinguish between the elements; they do not indicate a required or limited number of such elements, and do not indicate a particular position or order of such elements unless otherwise specifically stated. Any aspect shown or described with reference to a particular embodiment should be interpreted to be compatible with any other embodiment, alternative, modification, or variance.

I claim:

1. A camera, comprising:
a plurality of technical components including at least an optical system, an actuator device, and an energy source; and
a housing for receiving said technical components, the housing being detachable from the technical components, the housing including an interior web of slats for holding the technical components in place in the housing by form closure or positive fit when the housing is in a closed position, wherein the slats each protrude from inner walls of the housing and are not fixedly attached to the technical components;
wherein said housing is a disposable housing and has at least a predetermined breaking line structurally built into the housing to aid in breaking apart the housing where the housing is going to break in at least two halves such that the housing can be removed from the technical components;
further wherein the camera comprises a carrier construction and all the technical components are fixed to the carrier construction such that the technical components, connected together as one module by the carrier construction, are removable from the housing together as one module when the housing is in an open position.

2. The camera of claim 1, wherein said camera is a digital camera, and said technical components include an image sensor, and a memory for storing image data.

3. The camera of claim 2, wherein said technical components include at least one of a viewfinder and a monitor.

4. The camera of claim 3 wherein said technical components include a flashlight.

5. The camera of claim 2, wherein said housing is configured for physically blocking access to at least one of said memory and said energy source.

6. The camera of claim 1, wherein none of the technical components are directly affixed to the housing when the housing is in a closed position.

7. The camera of claim 6, wherein the slats are positioned on different inner walls to protrude in different directions.

8. The camera of claim 7, wherein only one end of each respective slat is attached to a respective inner wall.

9. The camera of claim 8, wherein said camera is configured for taking a limited number of exposures and for recording a limited time of film sequences, and for being reset after the housing has been removed from the technical components for allowing taking another sequence of a limited number of exposures and for allowing recording another limited time of film sequences, respectively.

10. The camera of claim 1, wherein said housing is configured for physically blocking access to any interface of the camera configured to transfer data from the camera to an external device.

11. The camera of claim 10, wherein said camera includes an interface for transferring data from said camera to an external device only after removing said housing from said technical components.

12. The camera according to claim 1, wherein said housing is watertight and encapsulates said technical components without being mounted to said technical components when the housing is in a closed position.

13. A digital camera, comprising:
a plurality of technical components including an optical system, an actuator device, an image sensor, a memory for storing image data, a monitor for displaying images, and an energy source, wherein all the technical components are connected together as one module via a carrier construction; and
a housing having inner walls that form an inside area for receiving said technical components, the housing being detachable from said technical components, the inner walls having one or more slats protruding from the respective inner wall into the inside area such that the one or more slats hold the technical components in place within the inner walls without the technical components being affixed to the housing, inner walls or slats when the housing is in a closed position;
wherein said camera does not include an accessible interface for transferring data from said camera to an external device,
further wherein the camera comprises a carrier construction and the technical components are fixed to the carrier construction such that the technical components are insertable into and removable from the housing as a single module.

14. The system of claim 13, wherein the housing has at least a predetermined breaking line where the housing is going to break in at least two halves such that the housing can be removed from the technical components; and further wherein, when the housing is in a closed position, the technical components are not affixed to the housing and are held in the housing by at least one of a form closure and positive fit within the housing.

15. A system for processing digital camera exposures, comprising:
a digital camera including a plurality of technical components including an optical system, an actuator device, an image sensor, a memory for storing image data, a monitor for displaying images, and an energy source, wherein all the technical components are connected together as one module via a carrier construction; and a housing having inner walls that form an inside area for receiving said technical components, the inner walls having one or more protrusions protruding from the respective inner wall into the inside area such that the one or more protrusions hold the technical components detachably coupled to the housing by form closure or positive fit and without being affixed to the housing or the protrusions when the housing is in a closed position, and wherein said camera includes a lock for preventing access to any interface of the digital camera in order to prevent data transfer from said camera to an external device unless an access key is applied for unlocking said lock.

16. The system of claim 15, further comprising a network including a provider station for providing digital processing services of data from said digital camera, and at least one user station connected to the provider station.

17. The system of claim 16, wherein said provider station stores data including camera exposures taken with said digital camera and allows access to said digital camera exposures upon input of an individual user identifier.

18. The system of claim 17, wherein said camera and said user identifier are provided as a set before using the camera during a single use stage, and the digital camera is preset for a limited number of exposures to be taken during said single use stage.

19. The system of claim 15, further comprising a carrier construction such that all the technical components are mounted as a single module to the carrier construction, the technical components being removable from the housing together as the single module, wherein the housing has at least a predetermined breaking line where the housing is going to break in at least two halves configured such that the housing can be removed from the single module of the technical components without damaging the technical components.

20. A camera, comprising:
a plurality of technical components including an optical system, an actuator device, an image sensor, a memory for storing image data, a monitor for displaying images, and an energy source; and a housing having inner walls that form an inside area for receiving said technical components, the housing being detachable from the technical components without damaging the technical components, the technical components being secured in the housing by at least one of a form closure and positive fit, the technical components being held in place by one or more protrusions each protruding from the respective inner wall into areas between the technical components, and without the technical components being affixed directly to the housing or the protrusions, when the housing is in a closed position;

wherein the camera comprises a carrier construction and all the technical components are fixed to the carrier construction such that the technical components are insertable into and removable from the housing together as one module when the housing is in an open position.

21. The camera of claim 20, wherein said housing includes the protrusions disposed on the front, first side, second side and bottom inner walls, wherein the protrusions each are attached only at one end to a respective inner wall with the other end of each protrusion protruding into the inner area facing different directions, such that the protrusions fit with and hold in place in the housing the technical components by positive locking or form closure when the housing is in a closed position, further wherein the technical components, connected together as one module by the carrier construction, are removable from the housing together as one module when the housing is in an open position.

* * * * *